Sept. 12, 1967

F. K. BENDER ET AL 3,341,679

METHOD AND APPARATUS FOR SPARK
ERODING CYLINDRICAL ROLLS

Filed Feb. 24, 1964

INVENTORS
Fred K. Bender
Georg Schlapp

BY Bailey, Stephens and Huettig
ATTORNEYS

Sept. 12, 1967  F. K. BENDER ET AL  3,341,679
METHOD AND APPARATUS FOR SPARK
ERODING CYLINDRICAL ROLLS
Filed Feb. 24, 1964 2 Sheets-Sheet 2

INVENTORS
Fred K. Bender
Georg Schlapp
BY
Bailey, Stephens and Huettig
ATTORNEYS

3,341,679
METHOD AND APPARATUS FOR SPARK ERODING CYLINDRICAL ROLLS
Fred K. Bender, New Isenburg, Hesse, and Georg Schlapp, Langen, Hesse, Germany, assignors to Nassovia Werkzeugmaschinenfabrik G.m.b.H., Frankfurt am Main, Germany
Filed Feb. 24, 1964, Ser. No. 346,883
Claims priority, application Germany, Mar. 2, 1963, N 22,835
6 Claims. (Cl. 219—69)

ABSTRACT OF THE DISCLOSURE

A spark erosion apparatus for forming profiled grooves in the surfaces of workpiece rollers is driven by endless belts connected to the rollers and to the electrode moving between the rollers.

---

Figure 1:
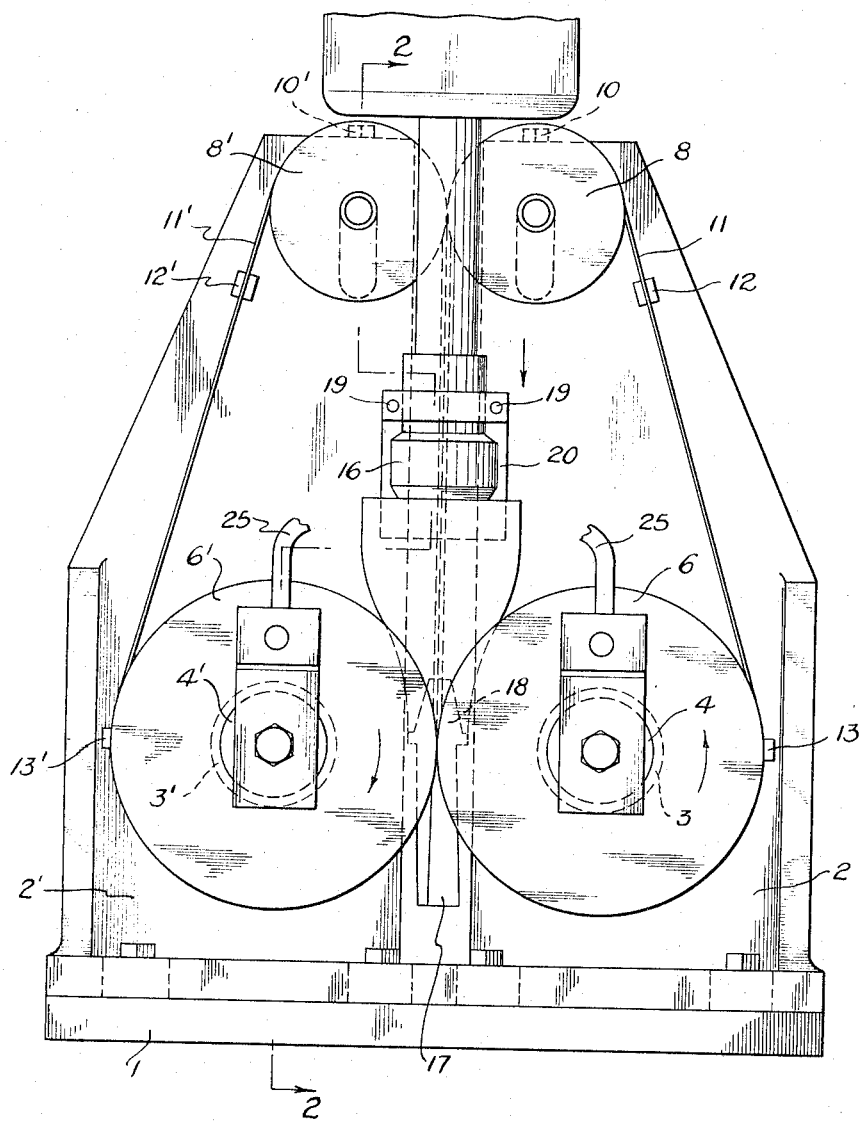

This invention relates to a method and apparatus for making rolls for the cold rolling of profiled articles. In particular, the invention is directed to the making of the rolls by spark erosion.

In the spark erosion process as applied to electrically conductive workpieces, it is well known that a true copy of the tool electrode is eroded in the workpiece by means of intermittent electrical spark discharges between the tool electrode and the workpiece.

Such method has been used for making spark-etched rolls used for the making of shaped surfaces on rods, such as in the making of rods for reinforced concrete. Such a roll is made by means of a circular tool electrode of the same diameter as the roll and having a positive pattern on its surface which is reproduced as a negative pattern in the surface of the roll by moving the tool electrode step by step relative to the workpiece. Only one roll can be produced by spark erosion in such method so that only a two dimensional profile can be produced in the roll. Also, it is expensive to make a tool electrode in a circular form or composed of a plurality of circular segments.

The object of this invention is to produce a method and apparatus for spark eroding a three dimensional negative pattern in a pair of rolls from a positive pattern tool electrode. For example, the tool electrode is in the positive pattern of a turbine blade which is reproduced in a pair of rolls so that the finished rolls can be used for cold rolling additional turbine blades. The positive pattern tool electrode is guided between the peripheries of a pair of contacting rolls during the spark erosion process, and which rolls rotate in opposite directions with respect to each other around two parallel axes in synchronism with the reciprocation with the tool electrode. Thus, as the tool electrode works between the two rolls, one half of its positive pattern is etched into the circumferential surface of each roll so that the longitudinal profile of a straight tool electrode is reproduced in the curved surfaces of the rolls. The reciprocating movement and feed of the tool electrode is controlled as customary by a shaft driven by a servo motor in dependence upon the electrical conditions at the spark gap.

The apparatus of this invention employs an endless belt for each roll, with each belt extending around a driving sheave and a tensioning sheave and being attached to the tool electrode. Alternately, each roll itself could serve as a driving sheave. In a simple form of the apparatus, the axes of the rolls extend horizontally from a vertical plane and lie in the same horizontal plane. Means are provided for adjusting the position of the rolls with respect to each other. The tensioning sheaves for the pulley belts are mounted at the top of the frame above the rolls so that each pulley belt has a reach both parallel to the reach of the other pulley belt and to the tool electrode. Means are provided for adjusting the tensioning sheaves both vertically and horizontally. These parallel belt reaches are attached to the tool electrode by an annular connecting piece. Preferably the pulley belts are made of steel or any other suitable material, such as a synthetic material.

Figure 2:
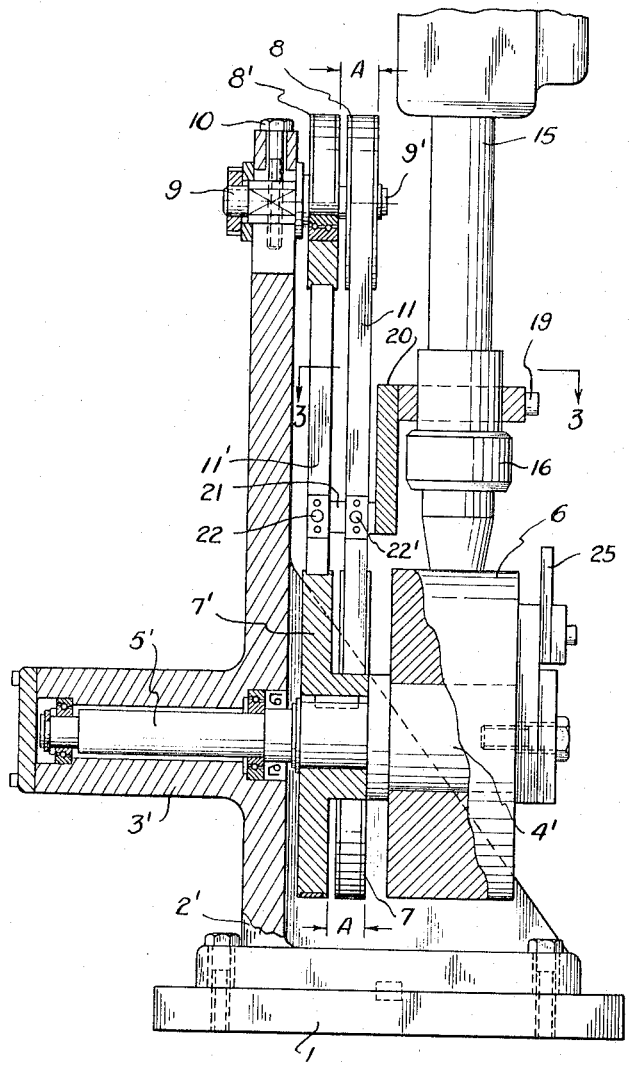
Figure 3:
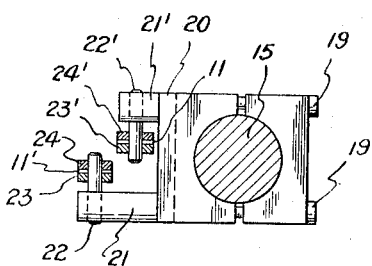

The means by which the objects of the invention are obtained are disclosed more fully with reference to the accompanying drawings in which:

FIGURE 1 is a front elevational view of the apparatus;
FIGURE 2 is a cross-sectional view taken on the line 2—2 of FIGURE 1; and
FIGURE 3 is a cross-sectional view taken on the line 3—3 of FIGURE 1.

As shown in FIGURES 1 and 2, the machine has a base plate 1 upon which are adjustably mounted a pair of vertical frame plates 2 and 2'. Each plate has a bearing boss 3 and 3', respectively. Chucks 4 and 4' have shafts 5 and 5' journalled in the bearing bosses 3 and 3'. The workpiece rolls 6 and 6' are carried on the chucks 4 and 4'. Shafts 5 and 5' also carry drive sheaves 7 and 7' which are lying in vertical planes horizontally separated by a distance A, FIGURE 2. At the top of each plate 2, there is mounted a tensioning sheave 8 and 8' by means of trunnions 9 and 9', respectively. Screws 10 and 10' are provided for both the vertical and horizontal adjustment of the tensioning sheaves 8 and 8' which are also spaced a distance A from one another. Each drive sheave and tensioning sheave has thereon a steel pulley belt 11 and 11', respectively, the ends of each belt being clamped together to form a pair of endless belts. Each belt is also fastened to its respective drive sheave by means of a bolt 13 and 13' set in the outer circumference of each drive sheave.

The working head 14 of the spark erosion machine includes a motor attached to a spindle which is worked in a general downward direction and which carries the chuck for holding the tool electrode. As shown, the tool electrode 17 has the shape of a turbine blade made of copper and the base of which is held by a schematically indicated clamp 18. The movement of spindle 15 is controlled in response to varying electric conditions at the spark gap which results in a constantly reciprocating forward and downward movement of the electrode between the roll workpieces 6 and 6'. These rolls thus must have a corresponding reciprocal movement so that the tool electrodes 17 can work between the two rolls 6 and 6' and erode one-half of its pattern into one roll and the other half of its pattern into the other roll. To accomplish this, a split collar is fastened by bolts 19 to chuck 16, with this collar being angularly downwardly extended by a plate 20 having horizontally positioned legs 21 and 21'. Pins 22 and 22', respectively, extend through these legs and are tightly secured to each of the parallel reaches of the steel pulley belts by bolting the bonding strips 23, 24, 23', 24'. Downward movement of the tool electrode 17 toward the rolls 6 and 6', as indicated by the arrow in FIGURE 1, thus causes a rotation of each roll in the direction of the arrow for the same relative distance. In this manner, the positive pattern of the electrode is completely eroded as a negative pattern in the circumferential surfaces of the rolls 6 and 6'.

The driving and tensioning sheaves have the same outside diameter as the rolls 6 and 6' and the tensioning sheaves are adjusted so that the parallel reaches of the pulley belts 11 and 11' are always vertical and parallel to each other and to the tool electrode when the roll workpieces 6 and 6' tangentially contact each other.

As is customary, this machine is operated when immersed in a dielectric liquid which has not been shown. The electrical lead line 25 is connected to the roll workpieces 6 and 6', while the electrical connection for the tool electrode has not been shown.

Having now described the means by which the objects of the invention are obtained, we claim:

1. An apparatus for forming cylindrical rolls for use in rolling out shaped bodies comprising a pair of tangential cylindrical roll workpieces, a tool electrode mounted for movement between said rolls, a drive sheave joined to each roll workpiece in said workpieces, an endless pulley belt extending around each drive sheave and connected to said tool electrode, and a belt tensioning sheave in engagement with each belt, respectively.

2. An apparatus as in claim 1, each drive sheave having a diameter equal to that of its respective workpiece.

3. An apparatus as in claim 1, one drive sheave and its tensioning sheave lying in a vertical plane horizontally offset from the vertical plane containing the other drive sheave and its tensioning sheave, and said pulley belts having reaches parallel to each other and to said tool electrode.

4. An apparatus as in claim 3, further comprising means for both vertically and horizontally adjusting said tension sheaves.

5. An apparatus as in claim 3, further comprising an angular connector joining said parallel reaches to said tool electrode.

6. An apparatus as in claim 5, said pulley belts being composed of steel.

References Cited

UNITED STATES PATENTS

| 3,148,446 | 9/1964 | Celovsky | 219—69 X |
| 3,230,412 | 1/1966 | Webb | 219—69 X |

RICHARD M. WOOD, *Primary Examiner.*

R. F. STAUBLY, *Assistant Examiner.*